(12) United States Patent
Balestrieri et al.

(10) Patent No.: US 11,037,214 B2
(45) Date of Patent: Jun. 15, 2021

(54) GENERATION OF PERFORMANCE OFFERINGS FOR INTERACTIVE APPLICATIONS

(71) Applicant: Hewlett Packard Enterprise Development LP, Houston, TX (US)

(72) Inventors: Filippo Balestrieri, Mountain View, CA (US); Bernardo Huberman, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 816 days.

(21) Appl. No.: 15/328,195

(22) PCT Filed: Sep. 26, 2014

(86) PCT No.: PCT/US2014/057565
§ 371 (c)(1),
(2) Date: Jan. 23, 2017

(87) PCT Pub. No.: WO2016/048334
PCT Pub. Date: Mar. 31, 2016

(65) Prior Publication Data
US 2017/0213266 A1    Jul. 27, 2017

(51) Int. Cl.
*G06Q 30/06* (2012.01)
*G06F 9/44* (2018.01)
(Continued)

(52) U.S. Cl.
CPC .......... *G06Q 30/0611* (2013.01); *G06F 9/44* (2013.01); *G06Q 30/0641* (2013.01); *H04L 67/28* (2013.01); *G06F 2009/45562* (2013.01)

(58) Field of Classification Search
CPC ..... G06Q 30/0601–0643; G06Q 30/08; G06Q 30/0611; G06Q 30/0641; G06F 9/44; G06F 2009/45562; H04L 67/28
See application file for complete search history.

(56) References Cited

U.S. PATENT DOCUMENTS 7,711,657 B1    5/2010 Huberman et al.
2006/0059107 A1*  3/2006 Elmore .............. G06Q 30/0601
705/64

(Continued)

FOREIGN PATENT DOCUMENTS

KR    1020130086789    8/2013

OTHER PUBLICATIONS

Huberman et al., "Ensuring trust in one time exchanges: solving the QoS problem", Dec. 6, 2005, 11 pages.

(Continued)

*Primary Examiner* — William J Allen
(74) *Attorney, Agent, or Firm* — Hewlett Packard Enterprise Patent Department

(57) ABSTRACT

A system, method, and a computer-readable storage device for generating a performance offering for executing an interactive application in a cloud system is described herein. In one aspect, a purchasing request is received from a customer device. The purchasing request may include an interactive application profile of an interactive application that lists a web service utilized by an interactive application. A performance offering for hosting the web service is then generated based on an analysis of a web service benchmark corresponding to the web service and a cloud profile. The cloud profile can characterize computing resources available within a cloud system. The performance offering is then communicated to the customer device as a user selectable menu option.

20 Claims, 8 Drawing Sheets

(51) Int. Cl.
*H04L 29/08* (2006.01)
*G06F 9/455* (2018.01)

(56) References Cited

U.S. PATENT DOCUMENTS

| | | | |
|---|---|---|---|
| 2006/0152756 A1* | 7/2006 | Fellenstein | G06Q 40/04 |
| | | | 358/1.15 |
| 2011/0010704 A1 | 1/2011 | Jeon et al. | |
| 2011/0138055 A1* | 6/2011 | Daly | G06F 9/505 |
| | | | 709/226 |
| 2012/0110462 A1 | 5/2012 | Eswaran et al. | |
| 2012/0196566 A1 | 8/2012 | Lee et al. | |
| 2012/0310764 A1* | 12/2012 | Sinsheimer | G06Q 30/06 |
| | | | 705/26.2 |
| 2012/0317266 A1 | 12/2012 | Abbott | |
| 2013/0060606 A1 | 3/2013 | Knapper et al. | |
| 2013/0346227 A1 | 12/2013 | Jain et al. | |
| 2014/0068602 A1 | 3/2014 | Gember et al. | |
| 2014/0278807 A1 | 9/2014 | Bohacek | |
| 2015/0019307 A1* | 1/2015 | Girard | G06Q 30/0267 |
| | | | 705/14.12 |
| 2015/0268935 A1* | 9/2015 | Muntes | G06F 8/20 |
| | | | 717/105 |

OTHER PUBLICATIONS

Jain et al., "A Truthful Mechanism for Value-Based Scheduling in Cloud Computing", Theory of Computing Systems, vol. 54, Issue 3, Apr. 2014, pp. 388-406.
Sandholm et al., "A statistical approach to risk mitigation in computational markets", HPDC '07 Proceedings of the 16th international symposium on High performance distributed computing, 2007, pp. 85-96.
Cristian Klein et al, Introducing Service-level Awareness in the Cloud, Jul. 2013, 16 Pgs.
Debajyotimukhopadhyay, QoS Based Framework for Effective Web Services in Cloud Computing, Nov. 28, 2013, 10 Pgs.
F. Muhss et al, The Commoditization of IT Services with Cloud Computing, May 18, 2011, 7 Pgs.
International Searching Authority, The International Search Report and the Written Opinion, PCT/US2014/057565, dated Jun. 16, 2015, 12 Pgs.
Wang S. et al, Cloud Model for Service Selection, Mar. 4, 2011, 6 Pgs.

\* cited by examiner

GENERATION OF PERFORMANCE OFFERINGS FOR INTERACTIVE APPLICATIONS

BACKGROUND

Due to increases in the speed of data transmission over networks and improvements in other network features, it is increasingly possible to perform large scale processing in an environment where computing resources are distributed and shared over a large network. A cloud provider, for example, may sell computing resources (e.g., virtual machines) from a cloud system that can be used by clients to execute applications or programs that perform large scale processing of data. In many cases, the cloud system may be partitioned to support multiple customers and such systems may be referred to as a multitenant system. To illustrate a multitenant system, a first customer may purchase X virtual machines from the cloud provider to run a first application, while a second customer may purchase Y virtual machines from the cloud provider to run a second application.

BRIEF DESCRIPTION OF DRAWINGS

Examples are described in detail in the following description with reference to examples shown in the following figures.

DETAILED DESCRIPTION

Figure 1:
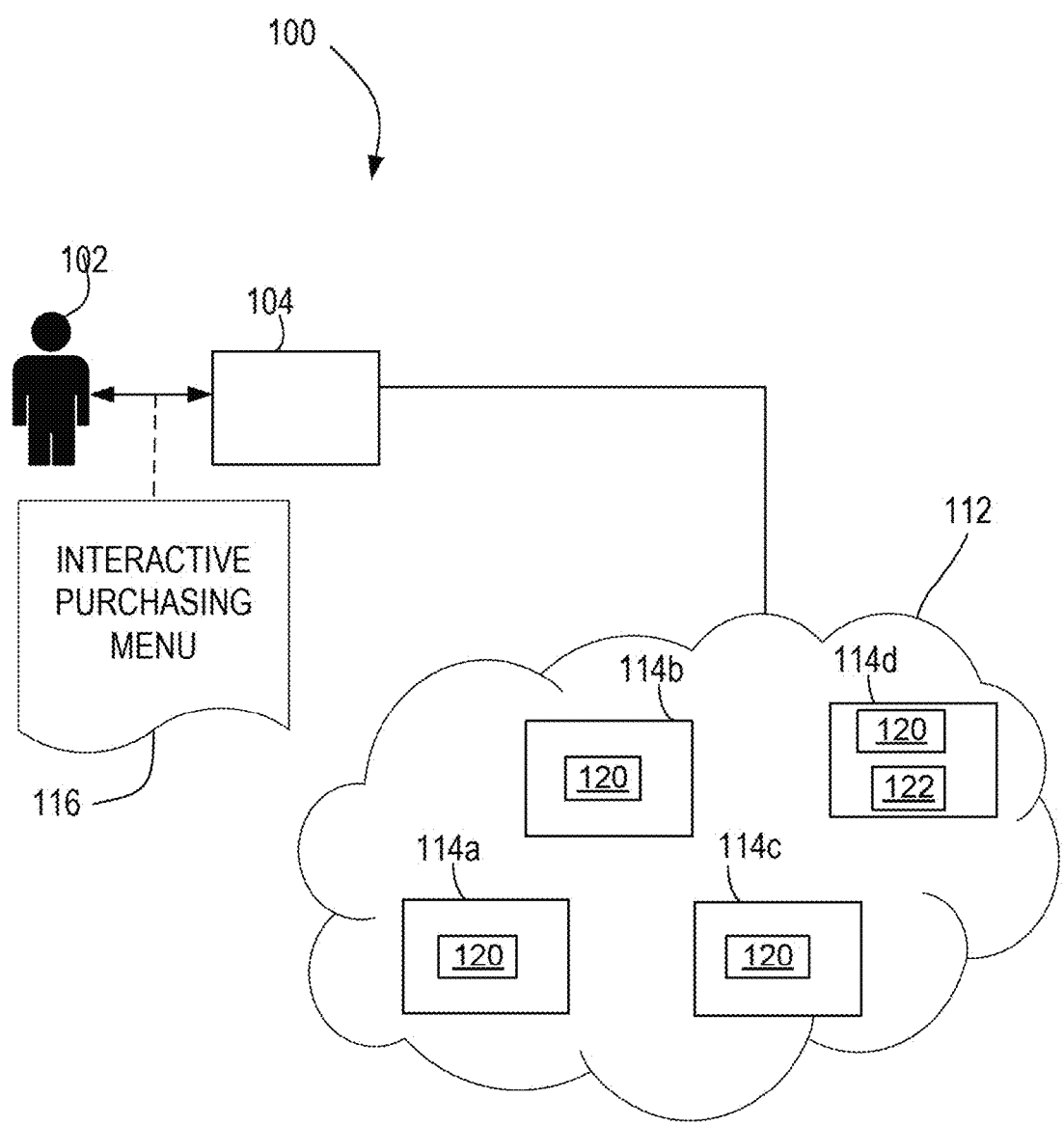
FIG. 1 illustrates an example interactive application processing system configured to host interactive applications in a cloud environment.

This disclosure discusses, among other things, methods, systems, and computer-readable storage devices that generate performance offerings for purchasing computer resources from a cloud system for deploying an interactive application. An interactive application, as used herein, may refer to an application that operates, at least in part, by responding to requests sent by clients of the interactive application. An illustrative example of an interactive application is a web-based application that utilizes such web services such as, for example, database services, messaging services, file upload services, web servers, web caching services, rate limiters, or any other suitable web service offered by a cloud provider.

A cloud provider may offer such web services for sale using a number of pricing models. For example, in one case, the cloud provider may offer to sell a web service based on an instance-based pricing model. An instance may be equivalent to a virtual machine that is provisioned within the cloud system and configured to provide the given web service on behalf of the interactive application. In this way, by allowing an application developer a choice in how many instances are provisioned to provide a web service, the application developer has some control over the computer resources (e.g., any combination of storage space, memory size, processor speed, or any other suitable computer resource) used to provide the web-service. For example, a web server service executing on 100 instances may handle a higher volume of requests over the same period of time than a web server service executing only on 10 instances. Thus, in an instance-based pricing model, the performance of a web service may depend on the number of instances selected and quantified by the application developer.

Depending on the web service desired (urgent or not, for example), application developers may select different instance-configurations, but their choice may not be the most appropriate due to lack of information. For example, the performance of a given configuration depends on the level of congestion of traffic to the instances that are part of the customer's application. This implies that, in some cases, customers may buy instances that are over-specified or under-specified in relation to a workload for the web services to which they are dedicated. Therefore, resources may be misallocated and the overall surplus (i.e. provider surplus, consumer surplus) may be kept inefficiently low. Moreover, the complexity of identifying the right configuration of instances may represent a market barrier-to-entry for potential customers that do not have or cannot afford to pay for administration skills. Furthermore, as a deployment grows in scale even the most tech-savvy administrators are challenged to avoid mistakes that can cause costly service interruption.

Rather than providing an instance-based purchasing model, examples discussed herein may provide a performance-based purchasing model for provisioning interactive applications on a cloud system. In a performance-based purchasing model, a pricing system may provide a customer with performance offerings that can be selected and purchased. In a performance offering, the customer is presented with a variety of combinations of performance metrics, performance variances, and/or traffic scenarios. A performance metric may include data relating to a quality of service associated with a web service. An example of a performance metric is processing time for a request (e.g., the time it takes to process a request, as may be measured from a start time to an end time), processing throughput (a number of requests that can be processed in a determinable time period), or processing load (e.g., the number of requests that can be simultaneously received and processed). A performance variance may be data that indicates a degree of uncertainty or risk in which the performance metric will not be met. The performance variance may be data expressible as any combination of a percentage, a time range (+/− a time), an average, an expected deviation, any other suitable expression of a deviation for the performance metric.

In an example, a computer system receives a purchasing request from a customer device. The purchasing request may include an interactive application profile of an interactive application that lists a web service utilized by an interactive application. The computer system may then generate a performance offering for hosting the web service based on an analysis of a web service benchmark corresponding to the web service and a cloud profile. The cloud profile can characterize computing resources available within a cloud system. The computer system can then communicate the performance offering to the customer device as a user selectable menu option.

These and other examples are now described in greater detail.

FIG. 1 illustrates an example interactive application deployment system 100 configured to execute interactive applications in a cloud environment. The interactive application deployment system 100, as shown in FIG. 1, includes a user 102, a purchasing system 104, and a cloud system 112. The illustrated layout of the web service system 100 shown in FIG. 1 is provided merely as an example, and other example interactive application processing systems may take on any other suitable layout or configuration. For example, although FIG. 1 shows that the purchasing system 104 is a separate system from the cloud system 112, other examples may be implemented such that the purchasing system 104, or modules/components thereof, is a sub-system of the cloud system 112.

The interactive application processing system 100 may include dedicated communication channels, as well as supporting hardware. In some examples, the interactive application processing system 100 includes one or more wide area networks (WANs) as well as multiple local area networks (LANs). The interactive application processing system 100 may utilize a private network, i.e., the interactive application processing system 100 and interconnections therewith are designed and operated exclusively for a particular company or customer, a public network such as the Internet, or a combination of both.

The user 102 may be an entity, such as a person (e.g., information technology administrator, application developer, or the like), an application, agent, or a service, that purchases computing capabilities from the cloud system 112 to execute an interactive application hosted on the cloud system 112. In an example, the user 102 may be a customer of the cloud system 112. The user 102 may also be operating a computer device communicatively coupled to the purchasing system 104. A computer device operated by the user 102 may be referred to herein as a customer device.

The purchasing system 104 may be a computer system that generates and communicates performance-based offerings to the user 102. In one way, the purchasing system 104 may generate the performance-based offering via an interactive purchasing menu 116. The interactive purchasing menu 116 may be an interface that can receive an interactive application profile from the user 102, communicate performance offerings to the user 102, and receive a user selection for one of the performance offerings. Examples of interactive purchasing menus are discussed in greater detail below.

The cloud system 112 is a computer system that pools together computing resources 114a-d (e.g., physical and/or virtual computer servers, storage devices, and the like) to serve multiple customers (such as, in some cases, the user 102) using a multi-tenant model. The computing resources 114a-d may be dynamically assigned and reassigned to support computing services for a tenant according to demand, and, in some cases, scaled out or released to provide elastic provisioning of computing capabilities. The computing resources 114a-d execute web services utilized by interactive applications by storing data, performing computational tasks, and exchanging data between the computing resources 114a-d. In some cases, computing resources 114a-d may be located geographically close to each other, and, in other cases, the computing resources 114a-d may be located far from the other compute nodes.

As just discussed above, the cloud system 112 may be a multi-tenant system that pools the computing resources 114a-d to execute multiple types of applications. For example, computing resources 114a-d may host virtual machines 120 provisioned and assigned to execute a variety of web services, while computing resource 114d hosts, in addition to an instance of the virtual machine 120, a virtual machine 122 that is provisioned and assigned to execute a different web service. It is to be appreciated that the number of virtual machines provisioned for one type of application may in cases affect the performance of the virtual machines provisioned for another type of application. For example, because the computing resource 114d hosts both the virtual machine 120 and the virtual machine 122, the computing resource 114d shares or otherwise time slices the processing time between the two virtual machines.

In some cases, the virtual machines 120 of the cloud system 112 execute an instance of a web service used by an interactive application in the cloud system 112.

In operation, when the user 102 wishes to deploy an interactive application on the cloud system 112, the purchasing system 104 may derive a set of performance offerings, where each performance offering specifies a different combination of performance metric, performance variance, and traffic scenario. The user 102 may then select one of the performance offerings presented by the interactive purchasing menu 116. In some cases, selecting a performance offering links the performance metric, performance variance, and traffic scenario to a time period. In some cases, the purchasing system 104 may generate and provide a price quote to the user based on the selected option. The user can accept the price quote or refuse. When a user refuses, the user can leave the system or go back to a prior stage (e.g., input a new application profile or select another performance offering). If, on the other hand, the purchasing system 104 receives an accepted price quote, the purchasing system 104 may then allocate and schedule resources of the cloud system 112 according to the selected performance offering. Thus, the purchasing system 104 provides a customer with a mechanism for specifying a cloud configuration that is based on a performance metric rather than an instance count.

Figure 2:
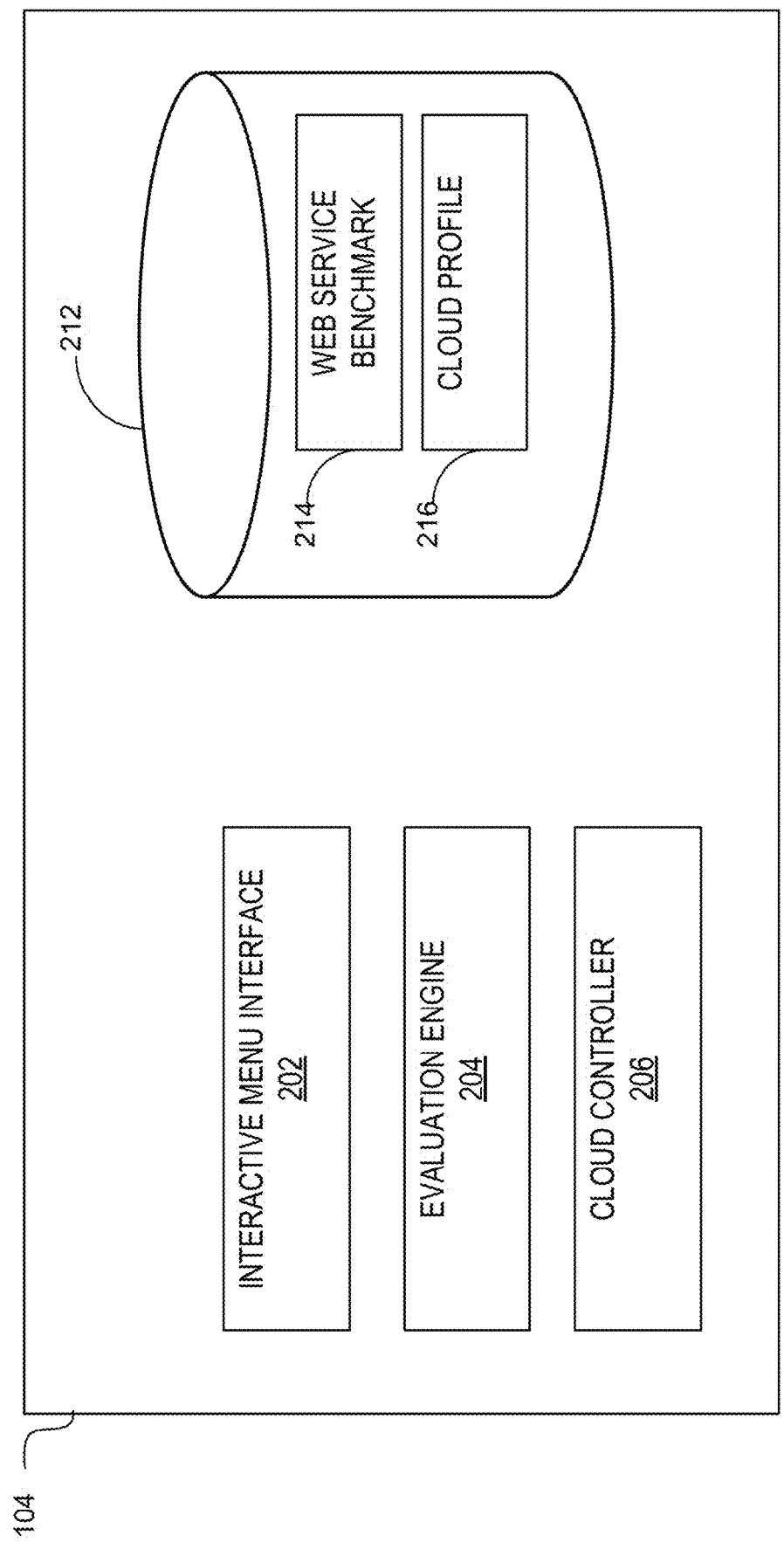
FIG. 2 is a block diagram illustrating modules of the purchasing system introduced in FIG. 1, according to an example.

FIG. 2 is a block diagram illustrating modules of the purchasing system 104 introduced in FIG. 1, according to an example. The purchasing system 104 includes an interactive purchasing menu interface 202, an evaluation engine 204, and a cloud controller 206. As used herein, a module may be implemented by processors executing instructions stored in a computer-readable storage device or by hardware logic (e.g., an application specific integrated circuit).

The interactive purchasing menu interface 202 may be a computer-implemented module that is configured to present and receive data relating to user interfaces displayed to the user 102. For example, the interactive purchasing menu interface 202 may generate an interactive purchasing menu that includes interface elements for specifying characteristics of an interactive application that may execute within the cloud system 112. As another example, the interactive purchasing menu interface 202 may generate user interface elements representing performance offerings. Examples of interactive purchasing menus are described in the foregoing.

The evaluation engine 204 may be a computer-implemented module that is configured to generate data relating to an interactive purchasing menu based on any of a combination of a user-supplied application profile, present and future cloud resource availability, user-selected performance metrics, performance variances, and traffic scenarios.

The cloud controller 206 may be a computer-implemented module that is configured to manage the allocation of computing resources to the interactive applications executing within the cloud system 112. As discussed further below, examples of the cloud controller 206 may allocate computing resources based on expectations of meeting a performance metric purchased by the user 102.

As FIG. 2 shows, the purchasing system 104 may include a database 212 for storing data usable by the modules of the purchasing system 104. For example, the database 212 includes web service benchmarks 214 and a cloud profile 216. The web service benchmarks 214 may include data or logic that characterize execution properties of a web service that can be hosted in the cloud system 112. Execution properties may characterize a web service by specifying an expected performance of a web service based on properties of input data (type, size, etc.), properties of the incoming requests (e.g., rate of requests, number of simultaneous requests, etc.), and the like. In some cases, the expected performance may be a function of an instance count or the types of resource allocated to the web service. The execution properties, in some cases, may be a model derived from historical data collected by monitoring the performance of a web-service over time.

The cloud profile 216 may include data or logic that characterize computing resources that are available in the cloud system 112 in a given period of time (e.g. from the current moment onward) to execute a web-service of an interactive application. A number of available virtual machines, processor time, time slots, and the like are examples of properties that may be specified by the cloud profile 216.

Example operations of the modules shown in FIG. 2 is discussed in greater detail below with reference to FIGS. 3-10.

Figure 3:
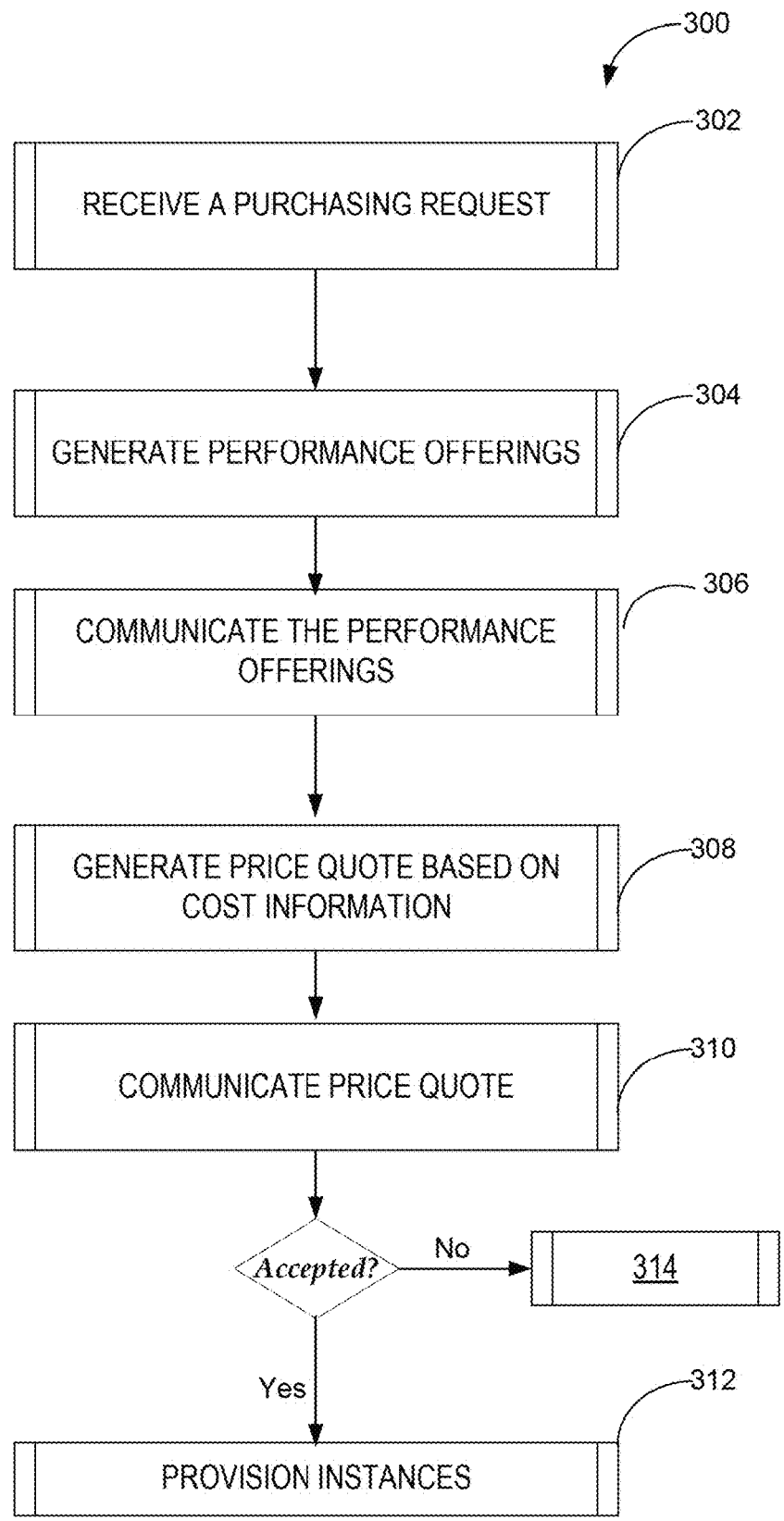
FIG. 3 is a flowchart illustrating a method for generating performance offerings for hosting an interactive application on a cloud system, according to an example.

FIG. 3 is a flowchart illustrating a method 300 for generating performance offerings for hosting an interactive application on a cloud system, according to an example. The method 300 may be performed by the modules, components, systems shown in FIGS. 1 and 2, such as the interactive purchasing menu interface 202, the evaluation engine 204, and the cloud controller 206 and, accordingly, is described herein merely by way of reference thereto. It will be appreciated that the method 300 may, however, be performed on any suitable hardware.

At operation 302, the interactive purchasing menu interface 202 may receive a purchasing request from a customer device. The purchasing request may be a message that includes an interactive application profile that, in turn, may include any combination of information regarding the kind of requests the interactive application can handle, input data, expected number of requests submitted simultaneously, and any other properties of the expected traffic. The interactive application profile may further list the types of web-services utilized by the interactive application. For example, the interactive application profile may list that the interactive application includes a file upload web service and a messaging web service. Still further, in some cases, the interactive application profile may include a mapping between request types and web services that may be activated based on receiving the request type. For example, requests of a given type may cause the interactive application to execute the file upload web service and the messaging web service, either sequentially or concurrently. It is to be appreciated that the above information, in whole or in part, may be inferred by a PaaS layer based on services used rather than be an input supplied by a user. For example, in many cases the PaaS layer may benchmark or infer a workflow of web services.

Responsive to receiving the purchasing request, the evaluation engine 204, at operation 304, may generate performance offerings for hosting the web services of the interactive application in the cloud system based on an analysis of a web service benchmark 222 corresponding to the web service and a cloud profile 224. Each performance offering be a combination of a performance metric (e.g., response time) and a performance variance that can be met by a web service in light of a given traffic load. Accordingly, each performance offering may include a combination of average (or maximum, or any other suitable statistic) response-time speed, expected traffic level, and a maximum traffic which the cloud provider can meet the performance metric in light of the performance variance. In some cases, the evaluation engine 204 may filter out performance offerings that do not bear a significant difference in costs from each other. This type of filtering may be performed based on a cost threshold that is definable by a cloud provider.

As discussed above, an interactive application may be a collection of web services and, as such, the performance offerings may be based on estimates that are aggregations of the performance offerings of the comprising web services.

It is to be appreciated that in some cases an evaluation engine may reject the request formulated in 302 by not generating any performance offerings. This may happen when, for example, there are insufficient resources available. In these cases, the customer can choose to reformulate the purchasing request or leave the system (and possibly buy instances in the traditional way).

At operation 306, the interactive purchasing menu interface 202 may communicate the performance offerings in an interactive offering menu. Via operation 306, the customer is offered a menu of performance offerings that vary according to a performance metric, a performance variance, and/or a traffic scenario. In some cases, from the interactive offering menu, the customer can select different performance offerings for different periods of time. For example, if the customer knows in advance that a traffic pattern for an application is likely to start slowly and increase according to a given function or profile, the customer may select performance offerings that relate to lower traffic loads in the nearest time periods and select for performance offerings that relate to higher traffic loads for later time periods.

Once the customer has made their selection of performance offerings the customer may then activate an element in the interactive offering menu to send the selections of the performance offerings to the purchasing system 104.

At operation 308, the interactive purchasing menu interface 202 receives the customer selections and the evaluation engine 204 may generate a price quote based on any combination of the cost information determined at operation 304, the time periods selected by the customer, and other information, such as, for example, information regarding customers willingness to pay for services offered. The price quote may be communicated to the customer at operation 310. If the customer accepts the price quote, method 300 may continue to operation 312.

At operation 312, based on receiving acceptance of the price quote, the cloud controller 206 may provision instances within the cloud system to provide the web services for the interactive application. The number of instances may be determined based on the offerings selected by the customer.

At operation 314, based on receiving rejection of the price quote, the customer can choose to go back to the purchasing request stage (e.g., see operation 302), performance offering selection stage (e.g., see operations 306 and 308), or abandon performance-based pricing, in which case the customer may wish to purchase resources using an instance-based purchasing model.

Figure 4:
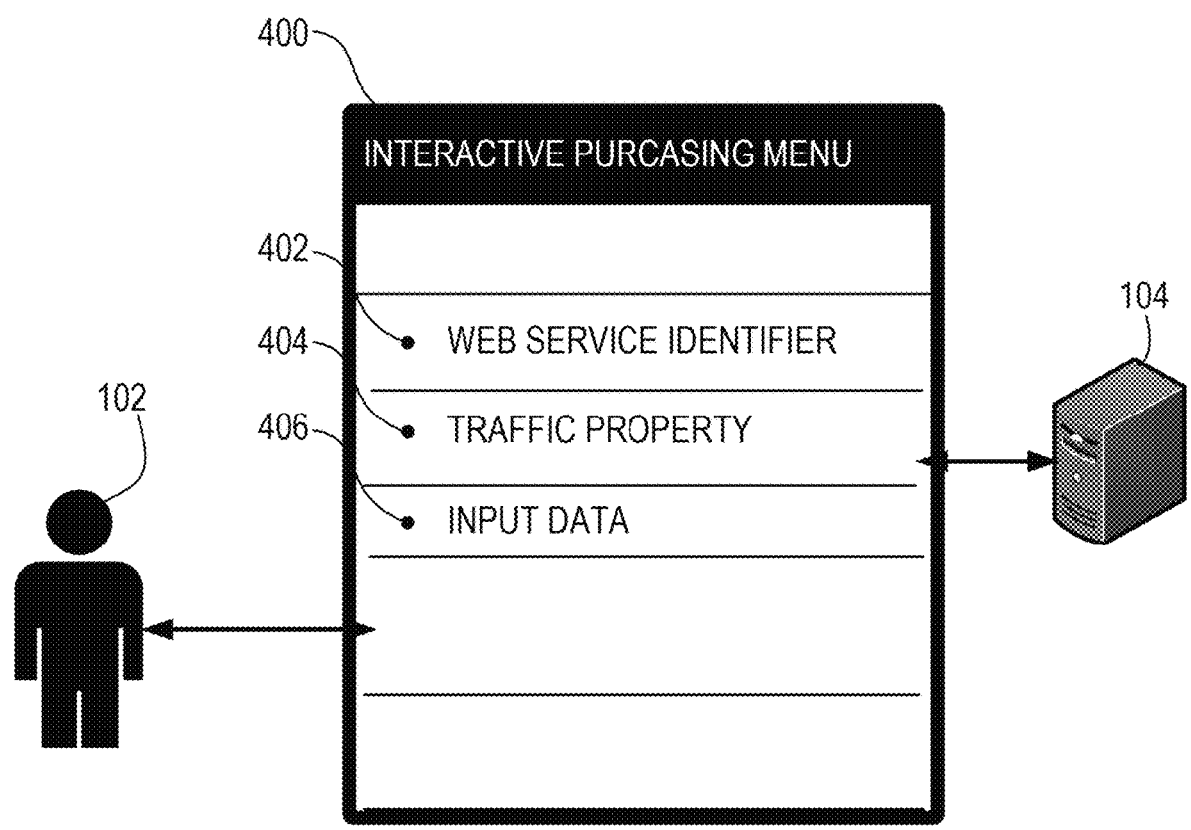
FIG. 4 is a diagram of an example of an interactive purchasing menu usable to generate a purchasing request, according to an example.

As described above, with reference to operation 302, the interactive purchasing menu interface 202 may receive a purchasing request from a customer device. FIG. 4 is a diagram of an example of an interactive purchasing menu 400 usable to generate a purchasing request, according to an example. The interactive purchasing menu 400 may be displayed, for example, by the purchasing system 104, or a customer device (e.g., a computer device, such as a laptop, desktop, tablet, mobile phone, and the like) operated by the user 102 and communicatively coupled to the purchasing system 104 through, for example, a network connection.

The interactive purchasing menu 400 includes one or more user supplied fields that specify web service identifier data 402, traffic property data 404, and input data 406. The web service identifier data 402 may uniquely identify a web service (or web services) capable of being hosted by the cloud system 112. In some cases, the web services may be database services, messaging services, file upload services, web servers, web caching services, rate limiters, or any other suitable web service offering offered by a cloud system 112. In some cases, the web service identifier data 402 may be a menu field that includes customer selectable menu options that are pre-populated by the cloud system 112. As discussed above, an interactive application may include multiple web services. The web service identifier data 402 may, in these cases, allow the customer to specify more than one web service that is part of the interactive application.

The traffic property data 404 may specify customer supplied data that characterizes the types and kinds of requests the interactive application may receive, including the traffic pattern, such as number of requests that may be received for a time period or the maximum number of requests that may be received simultaneously. Where the customer has identified multiple web services, the traffic property data 404 may link traffic properties to specific web services and, in some cases, whether a type of request will result in the activation of multiple web services and whether the activation is concurrent or sequential.

The input data 406 may be data that characterizes the input data being operated on by the web service. Examples of the input data may include data that specifies the size and/or distribution of the input data.

Figure 5:
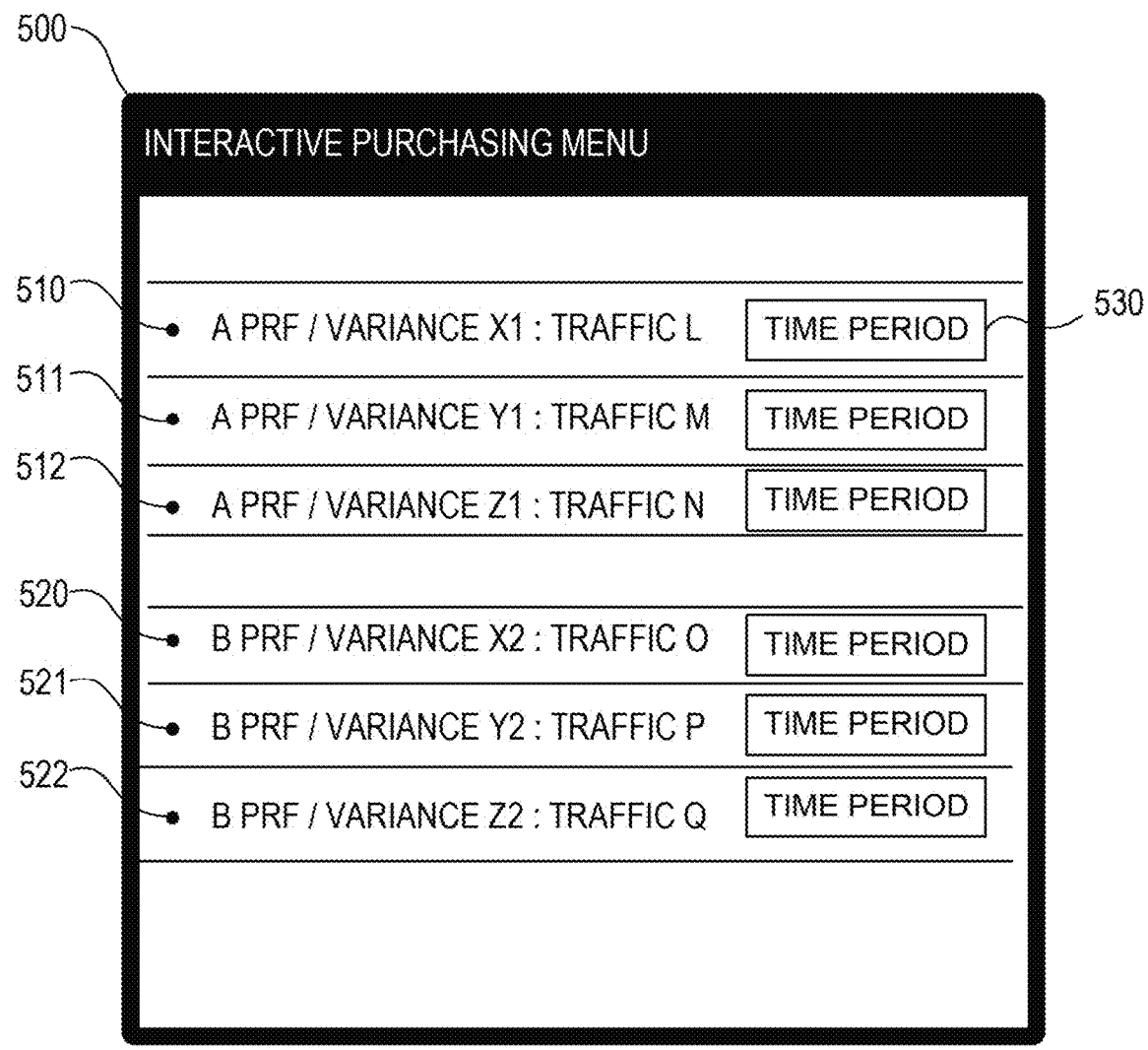
FIG. 5 is a diagram showing an interactive purchasing menu that includes user selectable performance offerings, according to an example.

As described above, with reference to operation 306, the interactive purchasing menu interface 202 may communicate a user-selectable performance offering through an interactive purchasing menu. FIG. 5 is a diagram showing an interactive purchasing menu 500 that includes user selectable performance offerings, according to an example. The interactive purchasing menu shown in FIG. 5 may be displayed, for example, by the purchasing system 104, or a customer device operated by the user 102 and communicatively coupled to the purchasing system 104.

The interactive purchasing menu 500 shown in FIG. 5 may list multiple performance offerings 510-512, 520-522 that each include a respective performance metric and performance variance combination linked to a traffic scenario. In some cases, the performance metric and performance variance combination may be expressed as an interval of possible outcomes for each metric, such as response times (e.g., 1-2 seconds, or any other suitable interval of a time period). The performance offerings 510-512 include performance metric and performance variance combinations that relate to the same performance metric value 'A' but to different performance variances (e.g., 'X1,' 'Y1,' and 'Z1'). Further, performance offerings 520-522 include performance metric and performance variance combinations that relate to the same performance metric value (e.g., performance metric value 'B') but to different performance variance values (e.g., 'X2,' 'Y2' and 'Z2').

Further, each of the performance offerings 510-512, 520-522 may include a traffic scenario (e.g., 'L'-'Q') in which the performance metric and performance variance can be met. The traffic scenario can be expressed as a maximum level at which the performance values can be met by the cloud provider.

Still further, each of the performance offerings 510-512, 520-522 may include a customer modifiable field for specifying a time period in which the corresponding performance metric/performance variance may apply. For example, the performance offering 510 includes the customer modifiable field 530 which allows the customer to specify a time period in which the customer would like the cloud system to provide service bounded by the performance metric and performance variance, in light of the traffic scenario. Linking a performance offering to a time period may provide a number of advantages. For example, by way of example and not limitation, some applications may have different patterns for request traffic. Such may be seen in mobile games or other applications that have a ramp up period. Different patterns may also be caused by periodic changes in demand experienced by an application. For example, a mobile commerce application may experience seasonal shifts in request patterns based on holidays or a product being in higher demand during a season.

Figure 6:
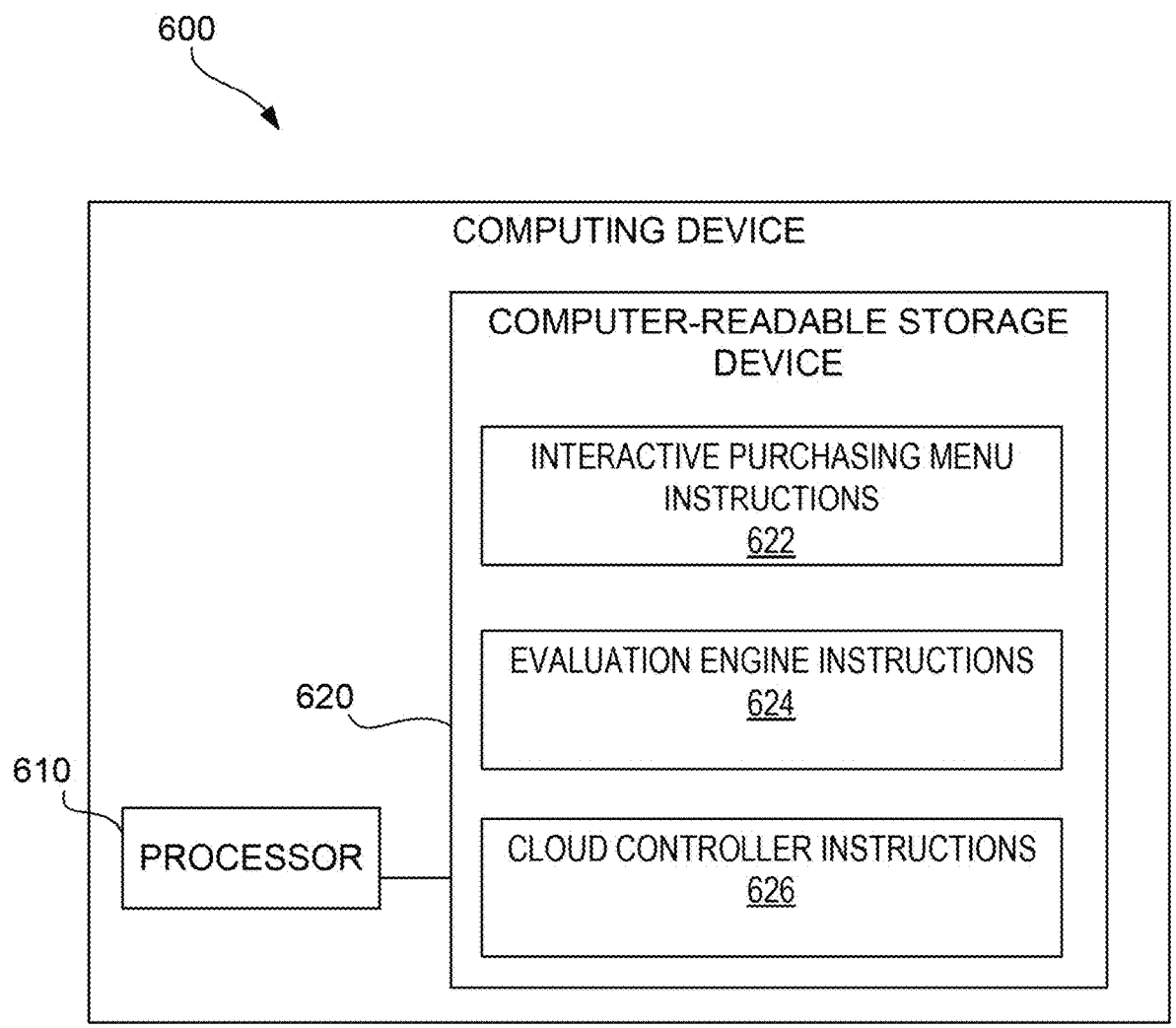
FIG. 6 is a block diagram of a computing device capable of generating a performance offering that includes an execution quality-uncertainty pair, according to one example.

FIG. 6 is a block diagram of a computing device 600 capable of generating a performance offerings for an interactive application, according to one example. The computing device 600 includes, for example, a processor 610, and a computer-readable storage device 620 including instructions 622, 624, 626. The computing device 600 may be, for example, a security appliance, a computer, a workstation, a server, a notebook computer, or any other suitable computing device capable of providing the functionality described herein.

The processor 610 may be at least one central processing unit (CPU), at least one semiconductor-based microprocessor, at least one graphics processing unit (GPU), other hardware devices suitable for retrieval and execution of instructions stored in computer-readable storage device 620, or combinations thereof. For example, the processor 610 may include multiple cores on a chip, include multiple cores across multiple chips, multiple cores across multiple devices, or combinations thereof. The processor 610 may fetch, decode, and execute one or more of the instructions 622, 624, 626 to implement methods, operations, and menus discussed above, with reference to FIGS. 1-5 and 8. As an alternative or in addition to retrieving and executing instructions, processor 610 may include at least one integrated circuit (IC), other control logic, other electronic circuits, or combinations thereof that include a number of electronic components for performing the functionality of instructions 622, 624, 626.

Computer-readable storage device 620 may be any electronic, magnetic, optical, or other physical storage device that contains or stores executable instructions. Thus, computer-readable storage device may be, for example, Random Access Memory (RAM), an Electrically Erasable Programmable Read-Only Memory (EEPROM), a storage drive, a Compact Disc Read Only Memory (CD-ROM), and the like. As such, the machine-readable storage device can be non-transitory. As described in detail herein, computer-readable storage device 620 may be encoded with a series of executable instructions for providing a performance offering includes an execution quality-uncertainty pair linked to a price quote.

Figure 7:
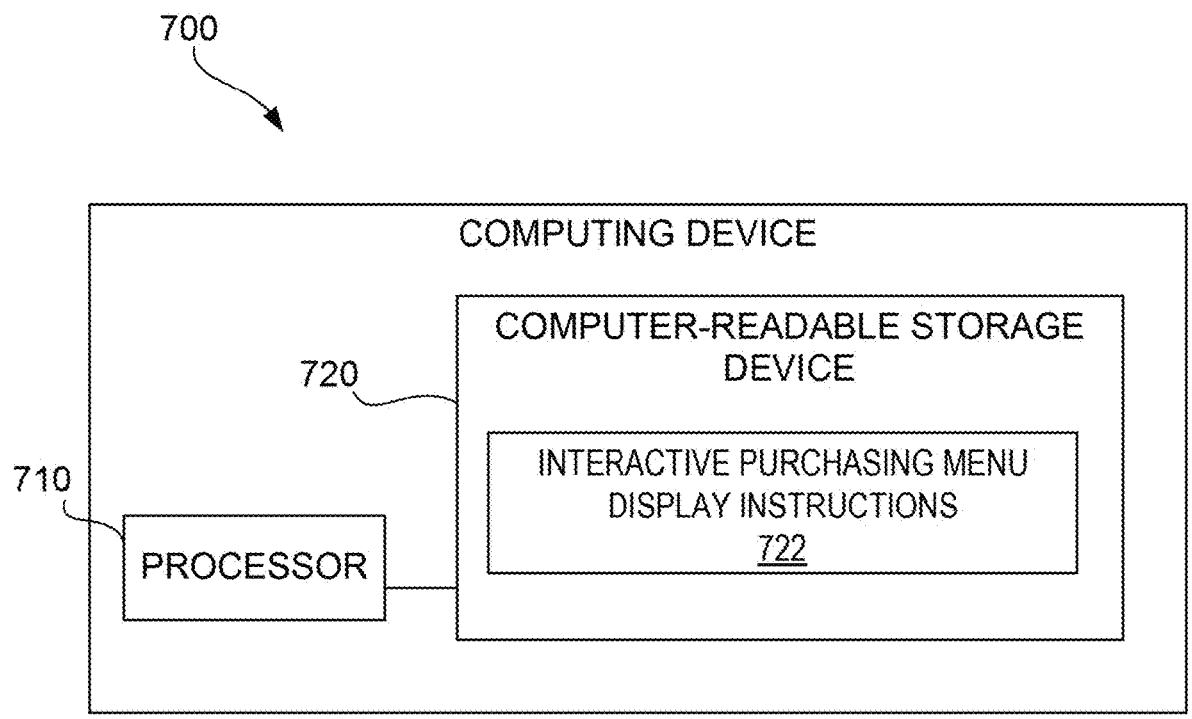
FIG. 7 is a block diagram of a computing device capable of display interactive menus, according to one example.

FIG. 7 is a block diagram of a computing device capable of display interactive menus, according to one example. The computing device 700 includes, for example, a processor 710, and a computer-readable storage device 720 including instructions 722. The computing device 700 may be, for example, a security appliance, a computer, a workstation, a server, a notebook computer, or any other suitable computing device capable of providing the functionality described herein.

The processor 710 may be, at least one central processing unit (CPU), at least one semiconductor-based microprocessor, at least one graphics processing unit (GPU), other hardware devices suitable for retrieval and execution of instructions stored in computer-readable storage device 720, or combinations thereof. For example, the processor 710 may include multiple cores on a chip, include multiple cores across multiple chips, multiple cores across multiple devices, or combinations thereof. The processor 710 may fetch, decode, and execute one or more of the instructions 722 to implement methods, operations, and menus discussed above, with reference to FIGS. 1-5 and 8. As an alternative or in addition to retrieving and executing instructions, processor 710 may include at least one integrated circuit (IC), other control logic, other electronic circuits, or combinations thereof that include a number of electronic components for performing the functionality of instructions 622.

Computer-readable storage device 720 may be any electronic, magnetic, optical, or other physical storage device that contains or stores executable instructions. Thus, computer-readable storage device may be, for example, Random Access Memory (RAM), an Electrically Erasable Programmable Read-Only Memory (EEPROM), a storage drive, a Compact Disc Read Only Memory (CD-ROM), and the like. As such, the machine-readable storage device can be non-transitory. As described in detail herein, computer-readable storage device 620 may be encoded with a series of executable instructions for providing a performance offering includes an execution quality-uncertainty pair linked to a price quote.

Figure 8:
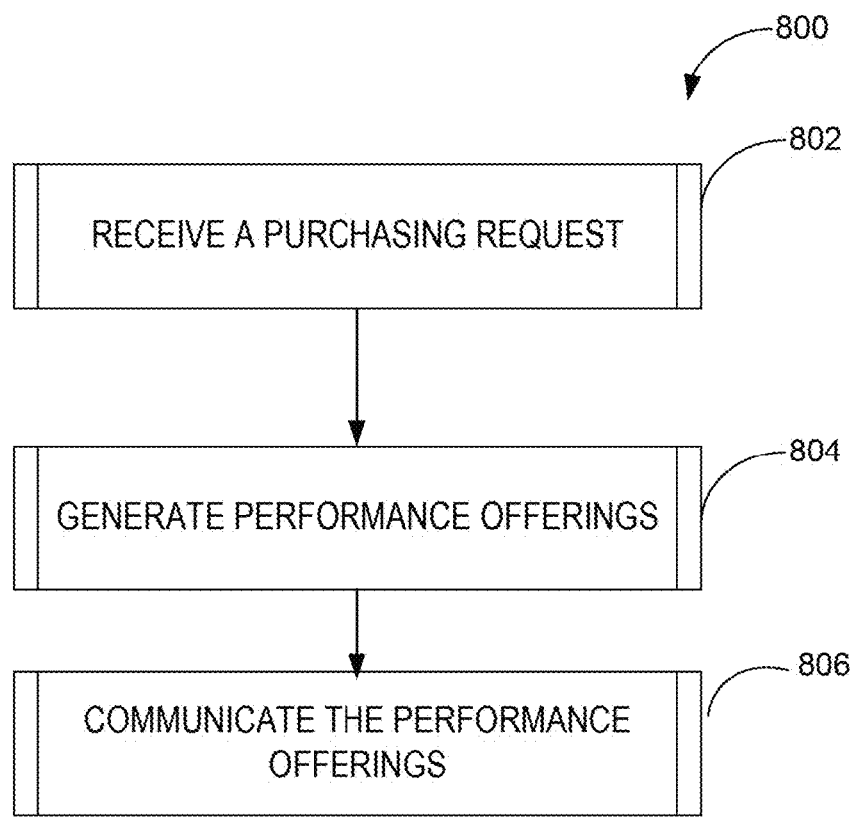
FIG. 8 is a flowchart illustrating a method for supporting a performance-based pricing model, according to an example.

FIG. 8 is a flowchart illustrating a method 800 for supporting a performance-based pricing model, according to an example. It is to be appreciated that many of the examples above may represent implementations of the method 800. The method 800 may begin at operation 302 when a computer system receives a purchasing request from a customer device. The purchasing request may include an interactive application profile of an interactive application that lists a web service utilized by an interactive application. The computer system may then, at operation 804, generate a performance offering for hosting the web service based on an analysis of a web service benchmark corresponding to the web service and a cloud profile. The cloud profile can characterize computing resources available within a cloud system. The computer system can then, at operation 806, communicate the performance offering to the customer device as a user selectable menu option.

As used herein, the term "computer system" may refer to one or more computer devices, such as the computer devices 600 shown in FIGS. 6 and 7. Further, the terms "couple," "couples," "communicatively couple," or "communicatively coupled" is intended to mean either an indirect or direct connection. Thus, if a first device, module, or engine couples to a second device, module, or engine, the connection may be through a direct connection, or through an indirect connection via other devices, modules, or engines and connections. In the case of electrical connections, such coupling may be direct, indirect, through an optical connection, or through a wireless electrical connection.

What is claimed is:

1. A method comprising:
receiving, from a customer device, a purchasing request, the purchasing request including an interactive application profile of an interactive application, the interactive application profile listing a web service utilized by the interactive application;
generating a performance offering and for hosting the web service based on an analysis of a web service benchmark corresponding to the web service and a cloud profile, the cloud profile characterizing computing resources available within a cloud system, the performance offering corresponding to a performance metric and a performance variance that indicates an expected deviation in the performance metric, the performance offering being associated with a traffic scenario that specifies a maximum data traffic load for which the performance metric and the performance variance can be met;
communicating the performance offering to the customer device as a user selectable menu option, wherein the user selectable menu option includes a customer modifiable field;
receiving, from the customer device, a customer selection of the performance offering with a time period specified in the customer modifiable field, wherein during the specified time period the cloud system is required to provide the web service to the interactive application at a performance level bounded by the performance metric and the performance variance as long as data traffic received by the interactive application does not exceed the maximum data traffic load specified by the performance offering;
provisioning, based at least in part on the customer selection of the performance offering, computing resources from the cloud system to host the web service for the interactive application, wherein provisioning the computing resources from the cloud system comprises provisioning a number of virtual machine instances needed to ensure that, for data traffic levels that do not exceed the maximum data traffic load, the web service provides the interactive application with the performance level bounded by the performance metric and the performance variance during at least the specified time period.

2. The method of claim 1, wherein the performance offering is communicated in an interactive application menu, the interactive application menu including the user selectable menu option.

3. The method of claim 2, further comprising:
generating a price quote based on the customer selection of the performance offering; and
receiving, from the customer device, an acceptance of the price quote,
wherein the computing resources of the cloud system are provisioned responsive to receiving the acceptance of the price quote.

4. The method of claim 3, further comprising updating the cloud profile to reflect the provisioned computing resources being unavailable.

5. The method of claim 1 further comprising determining that the performance offering is feasible in terms of computing resources available in the cloud system and different from other performance offerings communicated to the customer device with respect to at least one of the performance metric, the performance variance, or the traffic scenario.

6. The method of claim 1, wherein the performance offering is a first performance offering, the performance metric is a first performance metric, and the user selectable menu option is a first user selectable menu option, the method further comprising:
   generating a second performance offering for hosting the web service based on the analysis of the web service benchmark corresponding to the web service and the cloud profile, the second performance offering corresponding to a second performance metric different from the first performance metric; and
   communicating the second performance offering, in conjunction with communicating the first performance offering, to the customer device as a second user selectable menu option.

7. The method of claim 6, wherein the time period is a first time period, the method further comprising:
   receiving, from the customer device, a customer selection of the second performance offering being linked to a second time period;
   calculating a price quote to support the second performance metric associated with the second performance offering at the second time period; and
   communicating the price quote to the customer device.

8. The method of claim 7, wherein the maximum data traffic load specified by the first performance offering is a first maximum data traffic load, wherein the second performance offering specifies a second maximum data traffic load for which the second performance metric can be met, the second maximum data traffic load being greater than the first maximum data traffic load, and wherein the first performance offering is selected for the first time period and the second performance offering is selected for the second time period based on a first expected data traffic pattern for the interactive application during the first time period being less than a second expected data traffic pattern for the interactive application during the second time period.

9. The method of claim 1, wherein the time period specified in the customer modifiable field is selected based on an expected pattern for the data traffic received by the interactive application during the time period being less than the maximum data traffic load specified by the performance offering.

10. A system comprising:
   a memory;
   a hardware processor executing instructions from the memory to:
   receive, from a customer device, a purchasing request, the purchasing request including an interactive application profile of an interactive application, the interactive application profile listing a web service utilized by the interactive application;
   generate a performance offering for hosting the web service based on an analysis of a web service benchmark corresponding to the web service and a cloud profile, the cloud profile characterizing computing resources available within a cloud system, the performance offering corresponding to a performance metric and a performance variance that indicates an expected deviation in the performance metric, the performance offering being associated with a traffic scenario that specifies a maximum data traffic load for which the performance metric and the performance variance can be met;
   communicate the performance offering to the customer device as a user selectable menu option, wherein the user selectable menu option includes a customer modifiable field
   receive, from the customer device, a customer selection of the performance offering with a time period specified in the customer modifiable field, wherein during the specified time period the cloud system is required to provide the web service to the interactive application at a performance level bounded by the performance metric and the performance variance as long as data traffic received by the interactive application does not exceed the maximum data traffic load specified by the performance offering;
   provision, based at least in part on the customer selection of the performance offering, computing resources from the cloud system to host the web service for the interactive application, wherein provisioning the computing resources from the cloud system comprises provisioning a number of virtual machine instances needed to ensure that, for data traffic levels that do not exceed the maximum data traffic load, the web service provides the interactive application with the performance level bounded by the performance metric and the performance variance during at least the specified time period.

11. The system of claim 10, wherein the performance offering is communicated in an interactive application menu, the interactive application menu including the the user selectable menu option.

12. The system of claim 11, wherein the hardware processor further executes the instructions from the memory to:
   generate a price quote based on the customer selection of the performance offering; and
   receive, from the customer device, an acceptance of the price quote,
   wherein the computing resources of the cloud system are provisioned responsive to receiving the acceptance of the price quote.

13. The system of claim 12, wherein the hardware processor further executes the instructions from the memory to:
   update the cloud profile to reflect the provisioned computing resources being unavailable.

14. The system of claim 10, wherein the hardware processor further executes the instructions from the memory to:
   determine that the performance offering is feasible in terms of computing resources available in the cloud system and different from other performance offerings communicated to the customer device with respect to at least one of the performance metric, the performance variance, or the traffic scenario.

15. The system of claim 10, wherein the performance offering is a first performance offering, the performance metric is a first performance metric, and the user selectable menu option is a first user selectable menu option, and wherein the hardware processor further executes the instructions from the memory to:
   generate a second performance offering for hosting the web service based on the analysis of the web service benchmark corresponding to the web service and the cloud profile, the second performance offering corresponding to a second performance metric different from the first performance metric; and communicate the second performance offering, in conjunction with communicating the first performance offering, to the customer device as a second user selectable menu option.

16. The system of claim 15, wherein the time period is a first time period, and wherein the hardware processor further executes the instructions from the memory to:

receive, from the customer device, a customer selection of the second performance offering being linked to a second time period;

calculate a price quote to support the second performance metric associated with the second performance offering at the second time period; and communicate the price quote to the customer device.

17. A non-transitory computer-readable storage device comprising instructions that, when executed, cause a processor of a computer device to:

receive, from a customer device, a purchasing request, the purchasing request including an interactive application profile of an interactive application, the interactive application profile listing a web service utilized by the interactive application;

generate a performance offering for hosting the web service based on an analysis of a web service benchmark corresponding to the web service and a cloud profile, the cloud profile characterizing computing resources available within a cloud system, the performance offering corresponding to a performance metric and a performance variance that indicates an expected deviation in the performance metric, the performance offering specifying a maximum data traffic load for which the performance metric and the performance variance can be met;

communicate the performance offering to the customer device as a user selectable menu option, wherein the user selectable menu option includes a customer modifiable field receive, from the customer device, a customer selection of the performance offering with a time period specified in the customer modifiable field, wherein during the specified time period the cloud system is required to provide the web service to the interactive application at a performance level bounded by the performance metric and the performance variance as long as data traffic received by the interactive application does not exceed the maximum data traffic load specified by the performance offering;

provision, based at least in part on the customer selection of the performance offering, computing resources from the cloud system to host the web service for the interactive application, wherein provisioning the computing resources from the cloud system comprises provisioning a number of virtual machine instances needed to ensure that, for data traffic levels that do not exceed the maximum data traffic load, the web service provides the interactive application with the performance level bounded by the performance metric and the performance variance during at least the specified time period.

18. The non-transitory computer-readable storage device of claim 17, further comprising the instructions that, when executed, cause the processor of the computer device to:

generate a price quote based on the customer selection of the performance offering;

receive, from the customer device, an acceptance of the price quote, wherein the computing resources of the cloud system are provisioned responsive to receiving the acceptance of the price quote; and update the cloud profile to reflect the provisioned computing being unavailable.

19. The non-transitory computer-readable storage device of claim 17, wherein the performance offering is a first performance offering, the performance metric is a first performance metric, and the user selectable menu option is a first user selectable menu option, and further comprising the instructions that, when executed, cause the processor of the computer device to:

generate a second performance offering for hosting the web service based on the analysis of the web service benchmark corresponding to the web service and the cloud profile, the second performance offering corresponding to a second performance metric different from the first performance metric; and communicate the second performance offering, in conjunction with communicating the first performance offering, to the customer device as a second user selectable menu option.

20. The non-transitory computer-readable storage device of claim 19, wherein the time period is a first time period, and further comprising the instructions that, when executed, cause the processor of the computer device to:

receive, from the customer device, a customer selection of the second performance offering being linked to a second time period;

calculate a price quote to support the second performance metric associated with the second performance offering at the second time period; and communicate the price quote to the customer device.

* * * * *